United States Patent Office 2,756,664
Patented July 31, 1956

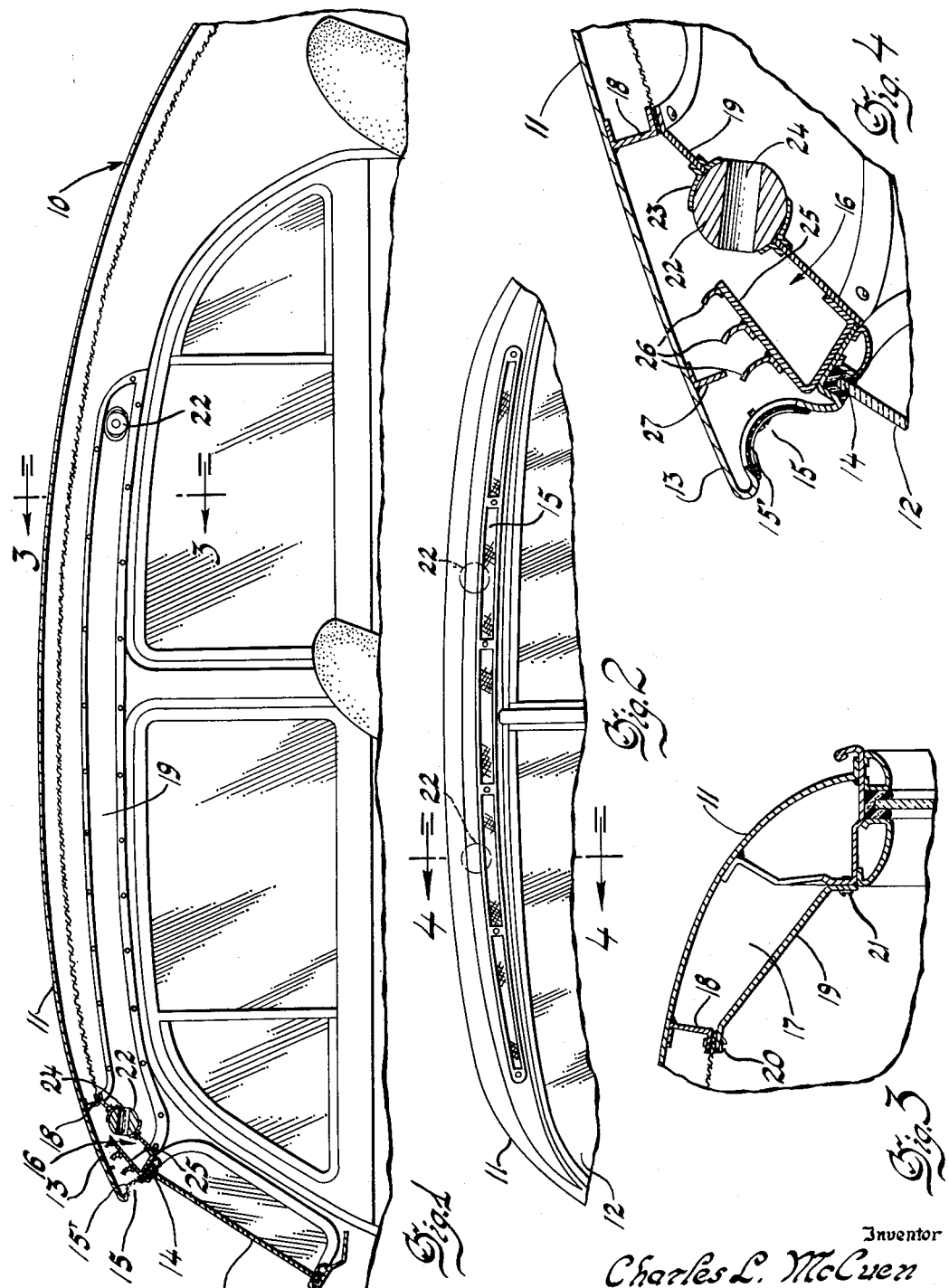
July 31, 1956    C. L. McCUEN    2,756,664
AIR CONDITIONING AND VENTILATING
SYSTEM FOR AUTOMOBILES
Filed April 5, 1952
Inventor
Charles L. McCuen
By Willito, Helwig & Baillio
Attorneys

2,756,664

AIR CONDITIONING AND VENTILATING SYSTEM FOR AUTOMOBILES

Charles L. McCuen, Bloomfield Hills, Mich., assignor to General Motors Corporation, Detroit, Mich., a corporation of Delaware Application April 5, 1952, Serial No. 280,811

1 Claim. (Cl. 98—2)

This invention relates to a vehicle ventilating system.

More particularly the invention relates to an improved type of high-level ventilating system in which one of the important features includes structure enabling the occupants to have a measure of air flow control heretofore unavailable.

At the present time most vehicles are so designed as to take in and discharge air for ventilating purposes, excluding window ventilation, at levels varying generally between the occupant's feet and midsection. An inherently objectionable resultant of such ventilation is the scooping in of air having a high concentration of vehicle exhaust fumes and road dust. Further, as is particularly noticeable during warm weather driving, the lower the level of air intake the warmer the air. As a consequence, the further from road level that air can be collected the cooler and purer it will be for ventilating purposes. Also, the ostensible universal practice currently favors low level discharge of ventilating air with the result that if the incoming air is relatively cooler than the air in the vehicle compartment it tends to stratify at a low level, only rising as it becomes warmer.

One purpose of the invention is to facilitate proper vehicle ventilation by the provision of an improved high-level intake and discharge ventilating system.

Past efforts to utilize such high-level ventilation have usually resulted in the use of either cumbersome and unsightly air intake structures, or systems providing inadequate air flow and distribution.

A further purpose of the invention is to provide an unobtrusive high-level ventilating system capable of supplying adequate quantities of relatively cool, clean air to a vehicle passenger compartment.

Further, it is proposed to provide a ventilating system which enables occupants of the vehicle not only to vary the quantity of fresh air admitted to the vehicle, but to variably concentrate or direct the air as the comfort of the occupants requires. In addition the invention enables the entire supply of ventilating air to be aimed or concentrated, if desired, upon any given area within the vehicle or permits the air to be divided and variably concentrated upon substantially an infinite number of areas within the vehicle. The ability to thus pin point or diversify ventilation as desired is regarded as one of the novel features of the system.

In an effort further to facilitate a more complete ventilation of a vehicle body, there is provided a combination of elements which delivers ventilating air at a velocity relatively greater than the velocity at which the vehicle is moving, thus increasing the ability of the air to more thoroughly permeate the passenger compartment.

It is also an object of the invention to provide a unique high-level air intake structure.

Also provided is a ventilating system designed to create a rain deflecting high pressure area about the air intake member opening.

Other objects of the invention will be apparent from examining the specification as set forth below.

In the drawings:

Figure 1 is a partially sectioned cutaway side elevational view of a vehicle body embodying the ventilating system embracing the invention.

Figure 2 is a partial front elevational view of the body showing in particular the air intake member employed.

Figure 3 is a sectional view along line 3—3 of Figure 1 showing the construction of the longitudinal portion of the air duct employed.

Figure 4 is an enlarged sectional view from Figure 1 and disclosing in greater detail the air intake, baffle and deflector valve structures.

It will be seen, Figure 1, that the present ventilating system is designed for use in a vehicle of the closed body type as indicated generally at 10. While the vehicle body is predominantly a unitary structure it is proper to designate a portion of that structure as a roof 11 and as having a windshield 12 disposed below the frontal termination of said roof.

The ventilating system includes an air intake member 13 disposed immediately above the windshield and formed as an integral part of roof 11. Normally a vehicle roof curves downwardly at the forward portion so as to terminate at the upper edge of the windshield and provide abutting support therefor. In the present structure, however, the frontal portion of roof 11 follows a rather flat curvature and terminates in spaced relationship to the upper edge 14 of said windshield. Consequently, a gap or opening 15 is formed between the upper edge 14 of the windshield and the leading edge of the roof. In this manner a rather inconspicuous air intake member is provided with a minimum disruption of the vehicle profile.

It is thus apparent that by such a construction the air intake member is practically as far removed from the road surface as is feasible without occasioning an undue change in the vehicle appearance.

The disposition and construction of the air intake member represent important features of the invention. Initially it should be observed that the ventilating system is illustrated in combination with an inclined windshield 12. While it is true that the system would function with other than an inclined windshield, optimum ventilating characteristics are achieved when combined with such a rearwardly inclined windshield. Air flow over such a windshield is relatively smooth and non-turbulent as contrasted with a vertical prototype with the result that a large volume of air is available at the air intake opening 15.

As may best be seen in Figure 4, the plane of the air intake opening 15 is substantially normal to the plane of the windshield 12. The intake has been thus designed to expose the maximum intake area to the air flowing upwardly across the windshield. In this manner it is insured that the impact and quantity of air flowing over the windshield are as fully utilized as is possible with the size of air intake available.

Mounted within air intake opening 15 is a recessed grill or screen member 15'. Member 15' provides the intake with a more finished appearance as well as preventing entry into the system of any sizeable objects carried in the air stream.

Because certain physical restrictions to the flow of air exist in the system, as will be hereinafter seen, greater quantities of air pass through the air intake member, particularly when operating at high speeds, than can be dispensed into the passenger compartment. The inevitable result is a pressure rise in the ventilating system. This pressure rise is manifested at the air intake opening as well as within the duct structure of the system. The high pressure at the intake opening is noted particularly because it is there made to perform a useful function. A pressure front thus exists about opening 15 which serves, when driving in the rain and at high speeds, to deflect particles or drops of rain over the top of the vehicle. While this pressure-deflection phenomenon does occur at high speeds, the pressure developed at low vehicle speeds is insufficient to achieve this result. However, any suitable drainage duct, not shown, may be provided to carry away such water particles as enter air intake 13 at low vehicle speeds. It is apparent that the simple drainage duct alone is inadequate, in the absence of air flow restrictions as provided by the present invention, to prevent suspended water particles from being carried into the system by the sheer force of the air flow during high speed vehicle operation. Consequently, the ventilating arrangement herein described includes structure which functions at high speed to keep water out of the air distributing system where a simple drainage duct would prove to be inadequate.

An air duct 16 is formed within the passenger compartment at approximately the vertical level of air intake member 13. The duct is generally U-shape and extends substantially across the width of the car in communication with air intake 13 as well as extending longitudinally along the respective sides of the car as at 17. Air duct 16 with its side branches 17 may be constructed in any suitable manner such as is shown in Figures 3 and 4. In this case, a longitudinally U-shaped channel member 18 is suspended from roof 11 so as to form the inner wall of the duct 16. The U-shaped duct 16 as thus defined by the channel member 18 is then further defined by a sheet metal covering 19. Covering 19 may be secured to channel 18 and the vehicle body in any suitable manner such as shown at 20 and 21, Figure 3.

In order to control the distribution and direction of flow of air from air duct 16 into the passenger compartment a plurality of manually adjustable spherical valves or air nozzles 22 is provided. Each nozzle or valve is mounted in a cutaway spherical seat 23 secured to duct covering 19. Each valve has an air passage 24 formed diametrically therethrough and through which air flows from the air duct to the passenger compartment. The spherical shape of each valve enables it to be universally adjusted to direct air to any inhabitable area within the compartment. As a result it is possible to train the flow of air from each valve on different areas or objects within the compartment or to mass the flow from each valve on a single area or object when an exceptionally heavy concentration of air is desired. The flow from the respective valves may be reduced or entirely cut off by rotating a valve until passage 24 is blocked partially or entirely by its spherical seat 23.

Insofar as the ventilating structure has been explained, it is possible to point out another noteworthy operating characteristic of the system. Since a rather large quantity of air can enter the ventilating system through intake 13 and a considerably lesser quantity can flow into the vehicle compartment because of the restricting influence of valves 22 it is apparent that the velocity of the air passing through passages 24 of the valves is increased relative to the speed at which it entered the car. Consequently, the velocity of the air available for ventilating purposes is measurably greater than the velocity of the vehicle. The advantage of this increased air velocity is a more forceful stream of ventilating air and with it a sensorily more satisfying ventilating system.

Mounted immediately behind the air intake opening 15 is a baffle plate 25, Figure 4, which extends substantially the length of intake member 13 to divide the forward portion of the duct into two communicating chambers. It is clear that either or both the opening 15 and the member 13 may extend any distance short of the width of the body 10. A plurality of baffle elements 26 are mounted upon baffle plate 25 and in conjunction with a baffle element 27 depending from roof 11 these elements serve to distribute more or less equal quantities of incoming air to the wing ducts 17. Without some such a baffle arrangement as herein illustrated the greatest proportion of ventilating air would be dispensed from the valve member or members closest to the air intake member with the more remotely disposed valves receiving considerable lesser quantities. In this way a more even distribution of air throughout the system can be obtained.

While it has been necessary for illustrative and descriptive purposes to disclose a particular manifestation of the invention, it is to be understood that numerous structural variations may be made in the system in the light of the invention and that such variations are fairly intended to be within the scope of the following claim.

I claim:

A vehicle compartment ventilating system, including in combination a windshield, a vehicle roof, the frontal portion of said roof being formed to provide an air intake opening adjacent the upper edge of said windshield and extending transversely along a substantial portion of the length of the latter, an air duct disposed at the upper end of said compartment having a central portion extending transversely of said vehicle in communication with said air intake opening and a portion extending longitudinally of said vehicle at either side of the latter, adjustable means mounted in said central and side duct portions for controlling and directing air flow directly into different portions of said compartment, and baffle means extending into said central duct portion from said air intake opening for deflecting the air entering said duct away from the said adjustable means in said central duct portion to insure distribution of air to all of the said adjustable means.

References Cited in the file of this patent

UNITED STATES PATENTS

| | | |
|---|---|---|
| 1,559,057 | Stewart | Oct. 27, 1925 |
| 1,626,893 | Twyman et al. | May 3, 1927 |
| 2,146,826 | Knapp | Feb. 14, 1939 |
| 2,172,939 | Lintern et al. | Sept. 12, 1939 |
| 2,202,703 | Lintern | May 28, 1940 |
| 2,516,805 | Rother et al. | July 25, 1950 |